United States Patent [19]

Boehmer et al.

[11] Patent Number: 5,536,021
[45] Date of Patent: Jul. 16, 1996

[54] DAMPER SEAL

[75] Inventors: Dennis A. Boehmer, Beavercreek; James C. Bailey, Yellow Springs, both of Ohio; Peter L. J. Nijland, De, Losser, Netherlands

[73] Assignee: Vernay Laboratories, Inc., Yellow Springs, Ohio

[21] Appl. No.: 415,659

[22] Filed: Apr. 3, 1995

Related U.S. Application Data

[63] Continuation-in-part of Ser. No. 144,343, Nov. 1, 1993, Pat. No. 5,454,573.

[51] Int. Cl.⁶ ............................................. F16J 9/00
[52] U.S. Cl. ..................... 277/207 R; 277/97; 277/165; 277/215
[58] Field of Search ............................ 277/97, 138, 152, 277/165, 205, 206 A, 207 R, 215, DIG. 9

[56] References Cited

U.S. PATENT DOCUMENTS

| | | | |
|---|---|---|---|
| 1,483,903 | 2/1924 | Masury . | |
| 2,465,175 | 3/1949 | Schwarz et al. | 277/205 |
| 2,907,596 | 10/1959 | Maha | 286/26 |
| 3,322,475 | 5/1967 | Schick | 308/36.1 |
| 3,854,737 | 12/1974 | Gilliam, Sr. | 277/205 |
| 3,861,691 | 1/1975 | Wheeler | 277/205 |
| 3,885,802 | 5/1975 | Wheeler | 277/215 |
| 3,995,332 | 12/1976 | Forchini et al. | 277/215 |
| 4,685,685 | 8/1987 | Iverson | 277/205 |
| 4,921,258 | 5/1990 | Fournier et al. | 277/29 |
| 5,205,568 | 4/1993 | Stoll et al. | 277/205 |

Primary Examiner—Daniel G. DePumpo
Attorney, Agent, or Firm—Biebel & French

[57] ABSTRACT

A damper seal for providing a seal between a housing and a tube extending through the damper seal. The damper seal includes a body portion having an exterior surface and opposing first and second ends, the body portion defining a longitudinal axis. An interior surface in the body portion defines an opening extending through the body portion along the longitudinal axis. In addition, a plurality of conically shaped apertures extend axially into the body portion from each of the ends toward an opposing end.

15 Claims, 8 Drawing Sheets

FIG-1A

PRIOR ART

FIG-1B

PRIOR ART

DAMPER SEAL

CROSS-REFERENCE TO RELATED APPLICATION

This application is a continuation-in-part of Ser. No. 08/144,343, filed Nov. 1, 1993 now U.S. Pat. No. 5,454,573.

BACKGROUND OF THE INVENTION

This invention relates to a seal for sealing a tube into a housing and, more specifically, to a seal for sealing a fuel pump nozzle into a housing of a fuel sender assembly, wherein the seal has a dual function of providing a fluid-tight seal and of damping vibrations between the fuel pump and the fuel tank.

Figure 1A:
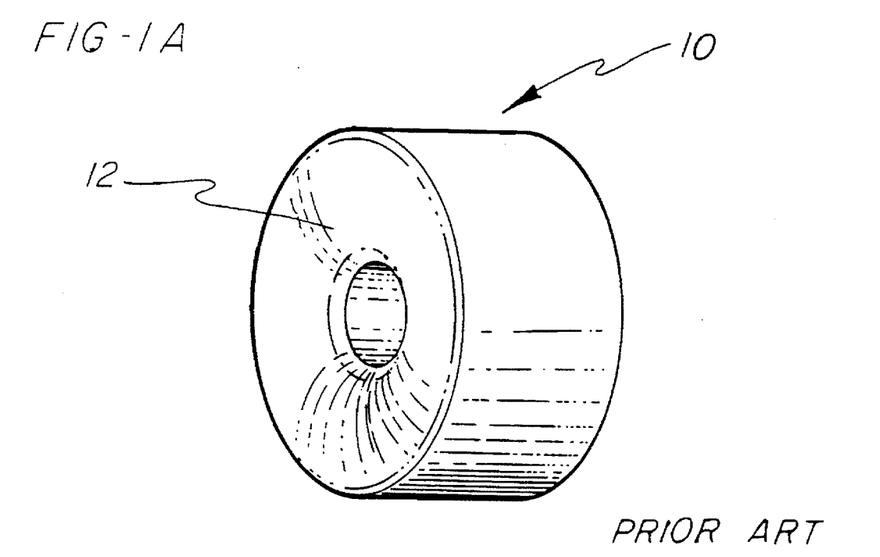
FIG. 1A is a perspective view of the prior art damper seal.
Figure 1B:
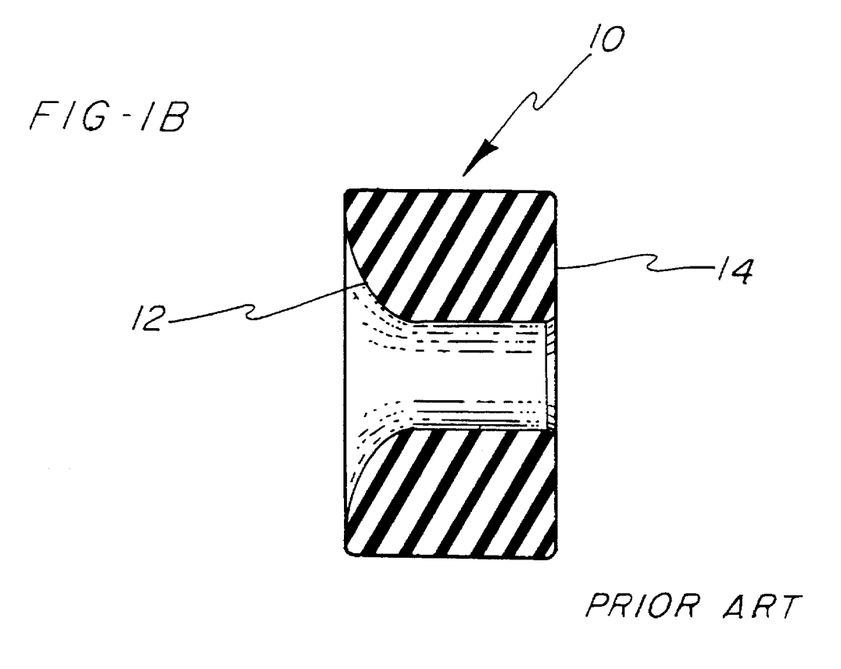
FIG. 1B is a cross-sectional view of the prior art damper seal.

In the past there have been attempts to provide a seal which will both seal a tube, such as a fuel nozzle, into a housing and also provide damping of any vibrations between the tube and the housing. One such prior seal is shown in FIGS. 1A and 1B. A leading edge 12 of the prior seal is tapered in from the outside edge to the inside edge for receiving the fuel pump spout, and a tail end 14 of the seal is formed with a planar surface. The seal is made out of a resilient elastomeric material in order to seal the tube into the housing and also to dampen vibrations between the housing and the tube.

The prior art seal relies on radial pressure exerted between a fuel pump spout and an inside housing diameter in order to provide an effective sealing function. In order to obtain the necessary radial pressure for maintaining a sealed condition between the fuel pump spout and the housing, the prior art seal must be compressed a significant amount such that assembly of the fuel pump spout, seal and housing has proven to be difficult. In addition, when exposed to fuel or fuel vapors, the seal tends to expand or swell excessively thereby increasing the internal forces within the seal and limiting the ability of the seal to function as a dampening element. Further, the internal forces resulting from the swelling of the seal may be so high as to lead to tearing of the seal when the seal is subjected to vibrations.

Another problem associated with the prior art seal relates to the material requirement for the seal. Specifically, since the prior art seal must be compressed a significant amount in order to establish an effective fluid tight barrier between a fuel pump spout and a housing, the seal must be formed of a highly flexible, and relatively expensive, material which is capable of compressing to conform to the space defined between the fuel pump spout and the inside diameter of the housing.

Accordingly, there is a need for a seal for performing a sealing and dampening function between a fuel pump spout and the inside diameter of a housing which is durable and easy to assemble. Further, there is a need for such a seal wherein the seal may be manufactured of a relatively inexpensive material and wherein the dampening function of the seal is substantially unaffected by swelling of the seal resulting from absorption of fuel and fuel vapors.

SUMMARY OF THE INVENTION

The present invention provides an annular damper seal for forming a sealing interface between a tube and a housing wherein the seal comprises an annular outer seal defining a radially outer surface for engaging the housing in sealing relationship, an annular inner seal defining a radially inner surface for engaging the tube in sealing relationship, the outer and inner seals being formed coaxial relative to a longitudinal axis, an annular channel defined by the outer and inner seals and positioned intermediate the outer and inner seals with the channel increasing the sealing of the outer and inner seals against the housing and the tube in response to an increase in pressure within the housing.

A damper portion of the annular damper seal has inner scallops which define longitudinal channels that extend parallel to the longitudinal axis. The inner scallops have inner surfaces for engaging the outer surface of the tube. The damper portion further includes outer scallops defining longitudinal channels extending parallel to the longitudinal axis. The outer scallops have outer surfaces which engage an inner surface of the housing. The inner and outer scallops dampen the vibrations between the tube and the housing. In addition, the inner and outer scallops are circumferentially offset relative to each other such that the longitudinal channels are adapted to accommodate swelling of the seal without significantly increasing the pressure within the material of the seal, and such that space is provided for permitting the seal to expand radially outwardly slightly during insertion of a tube through the seal.

In an another embodiment of the invention, an annular damper seal is provided including a body portion having an exterior surface and opposing ends, the body portion defining a longitudinal axis. An interior surface defines an opening extending through the body portion along the longitudinal axis for receiving a tube, and a plurality of apertures are formed extending axially into the body portion from each of the ends. The apertures are preferably formed having a substantially conical shape whereby the body portion is formed as a web-like structure for permitting expansion of the material forming the body portion between the exterior and interior surfaces. In addition, exterior annular seals extend radially outwardly from the exterior surface at each of the ends for engaging a housing surrounding the damper seal, and interior annular seals extend radially inwardly from the interior surface at each of the ends for engaging a tube extending through the damper seal.

Therefore, it is an object of the present invention to provide a damper seal performing a sealing interface between a tube and a housing.

It is another object of the present invention to provide a damper seal between a tube and a housing which includes a damper portion for absorbing vibrations wherein the performance of the damper portion is substantially unaffected by swelling of the material forming the seal.

Other advantages and objects of the present invention will be apparent from the following description, the accompanying drawings and the appended claims.

DESCRIPTION OF THE PREFERRED EMBODIMENT

The present invention provides a damper seal including a sealing portion for preventing flow of fluids through a space defined between a housing and a tube and a damper portion for isolating vibrations between the housing and the tube.

The present invention uses a ribbed or scalloped design to dampen the vibration between a tube such as a fuel pump nozzle and a housing such as a fuel canister assembly. Also, the present invention utilizes a seal which has a U-channel for increasing the sealing pressure when the pressure inside the housing increases. This U-channel utilizes the pressure to force the outer portion of the seal against the housing and the inner portion of the seal against the tube.

The use of the scallops allows the damper seal of the present invention to use less material and a less expensive material in order to perform the dampening function. Furthermore, the scallops of the present invention engage the housing and the fuel nozzle at staggered opposing points thereby enhancing the dampening characteristics and allowing the damper seal to expand, such as when fuel soaks into the seal, without affecting the sealing or dampning capabilities of the damper seal.

Figure 2:
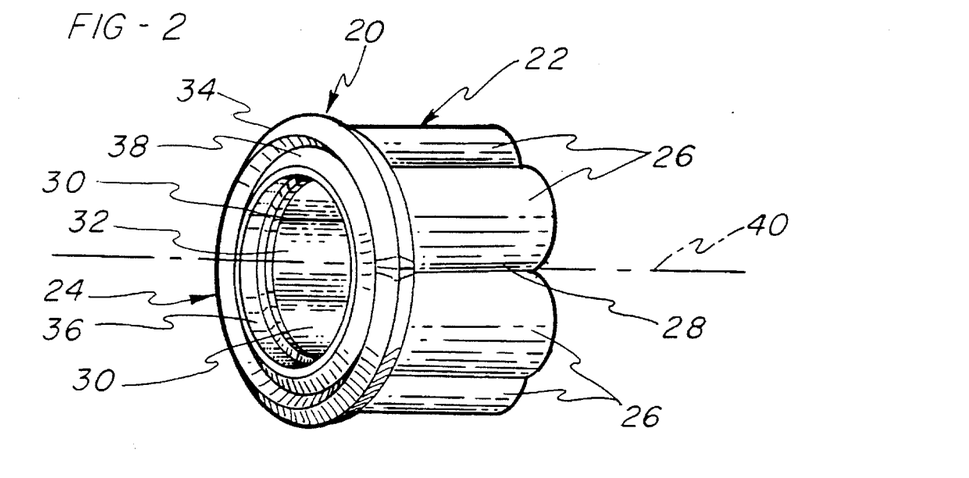
FIG. 2 is a perspective view of the damper seal of the present invention showing the seal portion.
Figure 3:
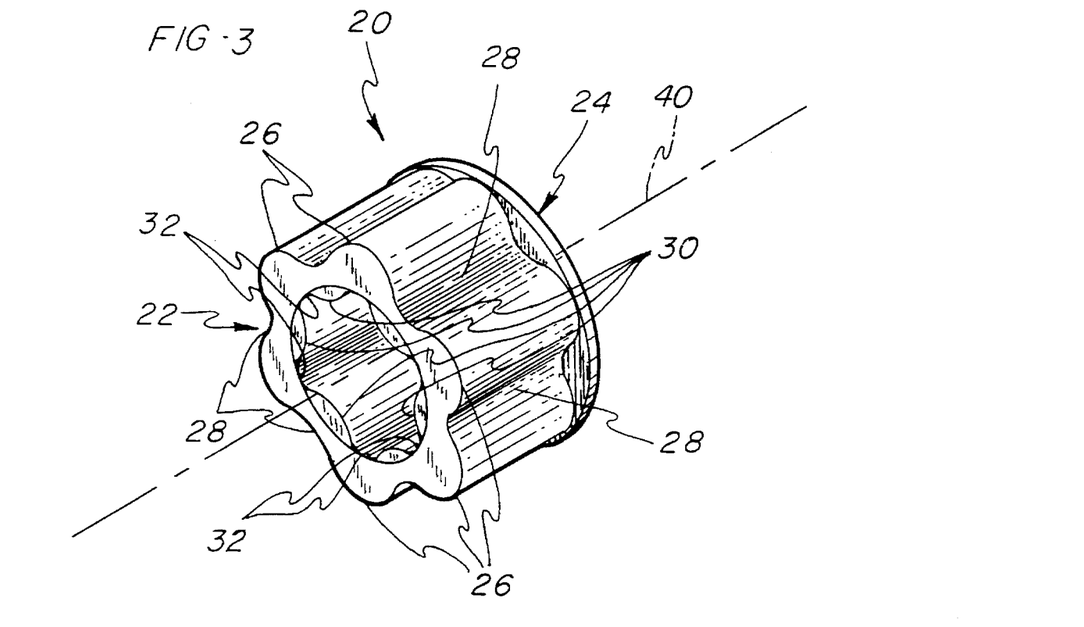
FIG. 3 is a perspective view of the present invention showing the damper portion.

Referring to FIGS. 2 and 3, the damper seal 20 is annular in shape having a damper portion 22 and a sealing portion 24. The damper portion 22 includes a plurality of outer scallops 26, or ribs, which define channels 28 between each outer scallop 26 running parallel to the longitudinal axis 40. In addition, inner scallops 30, or ribs, define a passage for receiving a fuel nozzle and the inner scallops 30 define inner channels 32 extending parallel to the longitudinal axis along the length of the scallops 30.

Figure 4:
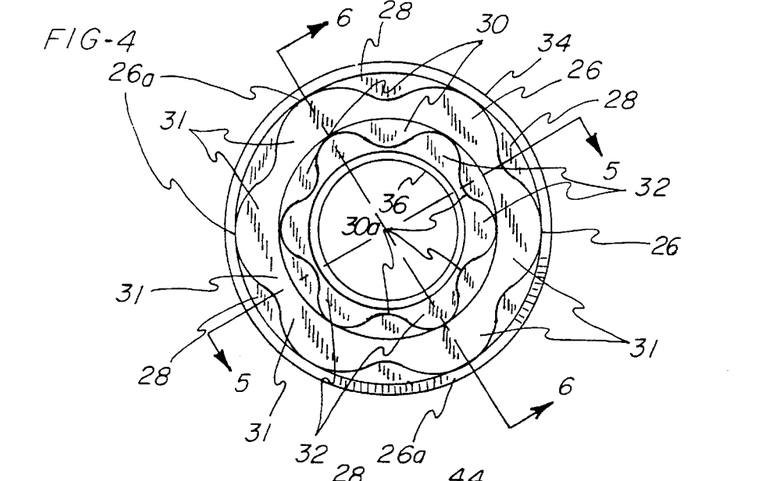
FIG. 4 is an end view showing the damper end of the present invention.

As may be seen in FIG. 4, each of the outer scallops 26 include an apex defining a contact point 26a for contacting a surface defining an inside diameter of a housing into which the damper seal 20 is mounted. Similarly, the inner scallops 30 include an apex defining a contact point 30a for contacting the outer diameter of a tube, such as a fuel nozzle spout, inserted through the damper seal 20.

In the embodiment illustrated, the outer scallops 26 are circumferentially displaced from each other by 60°, and the inner scallops 30 are also. circumferentially displaced from each other by 60°. In addition, the outer scallops 26 are circumferentially offset relative to the inner scallops 30 by 30° such that the outer and inner scallops 26, 30, as well as the respective channels 28, 32, are placed at staggered locations around the circumference of the damper seal. The offset or staggered pattern for these scallops 26, 30 facilitates the isolation of vibrations transmitted between a housing supporting the damper seal 20 and a tube extending through the interior of the damper seal 20. Specifically, the offset scallop configuration insures that vibrations traveling through the damper portion 22 of the damper seal 20 do not have a direct path of solid material to travel through when being transmitted through the damper portion 22 in a radial direction. In other words, the present damper portion 22 provides a bridge area 31 of material extending between each of the outer contact points 26a and the inner contact points 30a wherein the channels 28, 32 provide the bridge area 31 with room to flex in the space between a housing and a tube located in engagement with the damper seal 20. Thus, vibrations will be substantially absorbed in the bridge area 31 to provide effective vibration isolation between the housing and the tube located in contact with the damper seal 20.

Another advantage provided by the offset scallop design of the damper portion 22 includes the ability of the damper portion 22 to expand, for example during absorption of fuel or fuel vapors, without substantially affecting the ability of the damper portion 22 to absorb vibrations. In particular, the outer and inner channels 28, 32 provide space for the damper seal to expand in the event that the material forming the damper seal is caused to swell when it is in place between a housing and a tube.

Further, the channels 28, 32 also facilitate insertion of a tube through the damper seal during an assembly operation in that the material forming the damper portion may temporarily move into the areas of the channels 28, 32 in order to permit passage of a tube end, which in certain circumstances may be slightly enlarged beyond the normal diameter of the tube. It should also be noted that as a result of providing contact points 26a, 30a, there is reduced surface contact between the damper seal 20 and the housing and tube surfaces such that frictional resistance to the damper seal 20 being inserted into the housing and the tube being inserted through the damper seal 20 is reduced to thereby also facilitate assembly.

Figure 5:
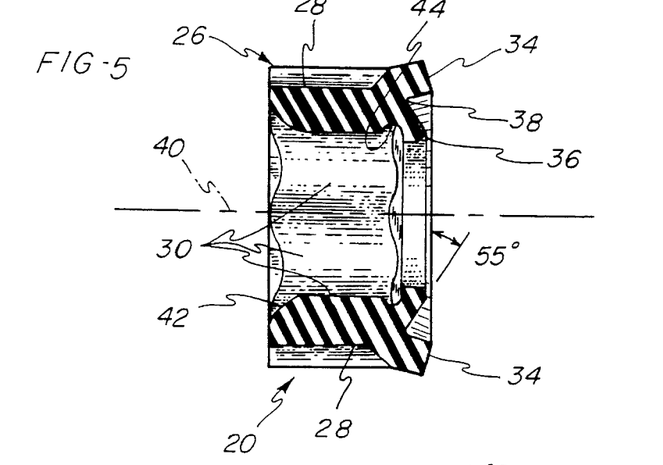
FIG. 5 is a cross-sectional view taken along line 5—5 in FIG. 4.
Figure 6:
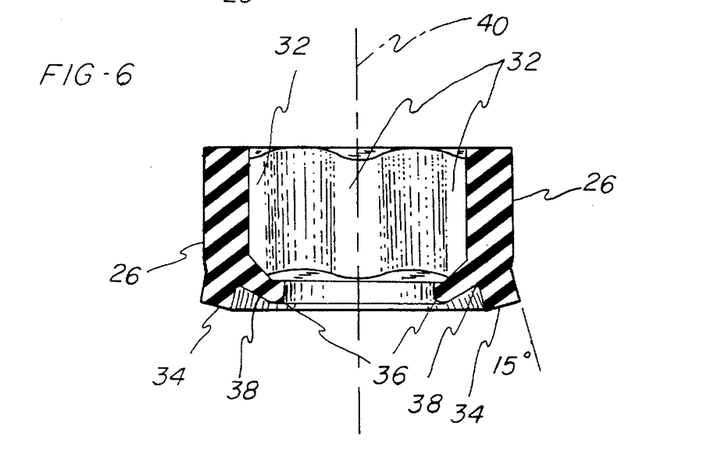
FIG. 6 is a cross-sectional view taken along line 6—6 in FIG. 4.

Referring to FIGS. 2, 5 and 6, the damper seal 20 includes an outer seal 34 extending radially outwardly at a 15° angle relative to the longitudinal axis 40, and an inner seal 36 is provided adjacent to the outer seal 34 and extends radially inwardly at an angle of approximately 55° relative to the longitudinal axis 40. A U-channel 38 is defined between the outer and inner seals 34, 36 and facilitates sealing against a housing and a tube in that a fluid pressure exerted from within the housing in the direction of the U-channel 38 will act to bias the outer seal 34 outwardly and the inner seal 36 inwardly into contact with the housing and tube, respectively.

It should also be noted that the outer seal 34 defines an outer diameter which is slightly greater than a diameter defined between outer contact points 26a on diametrically opposing outer scallops. This difference in diameters insures that when the damper seal 20 is inserted into a housing aperture having a diameter adapted to engage the outer contact points 26a, the outer seal 34 will be compressed slightly radially inwardly to thereby form a positive seal between the damper seal 20 and the housing. Similarly, an inner diameter defined by the inner seal 36 is slightly smaller than a diameter defined between contact points 30a on diametrically opposing inner scallops 30 such that a tube having a diameter sufficiently large to engage the contact points 30a will also engage and cause the inner seal 36 to expand slightly outwardly and thereby insure that a positive seal is formed between the tube and the inner seal 36.

Referring to FIG. 5, it should also be noted that each of the inner scallops 30 includes an end surface opposite from the seals 34, 36 which is tapered at approximately a 45° angle with respect to the longitudinal axis 40. The tapered edges of the inner scallops 30 provides a contour for facilitating insertion of the end of a tube or fuel nozzle spout into the damper seal 20.

Figure 7:
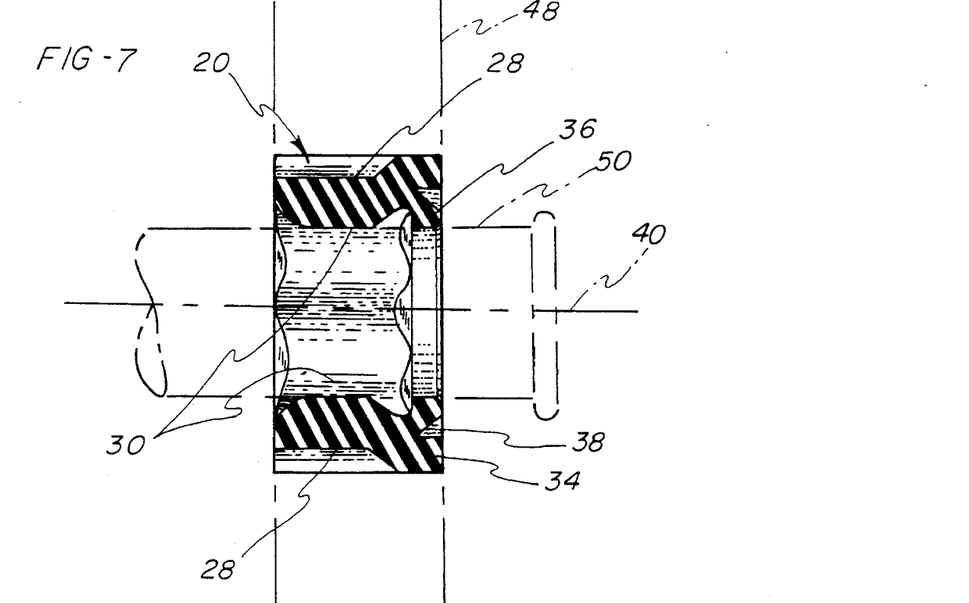
FIGS. 7 and 8 are a cross-sectional views similar to FIGS. 5 and 6, respectively, depicting the damper seal installed in a housing with a tube positioned therethrough.
Figure 8:
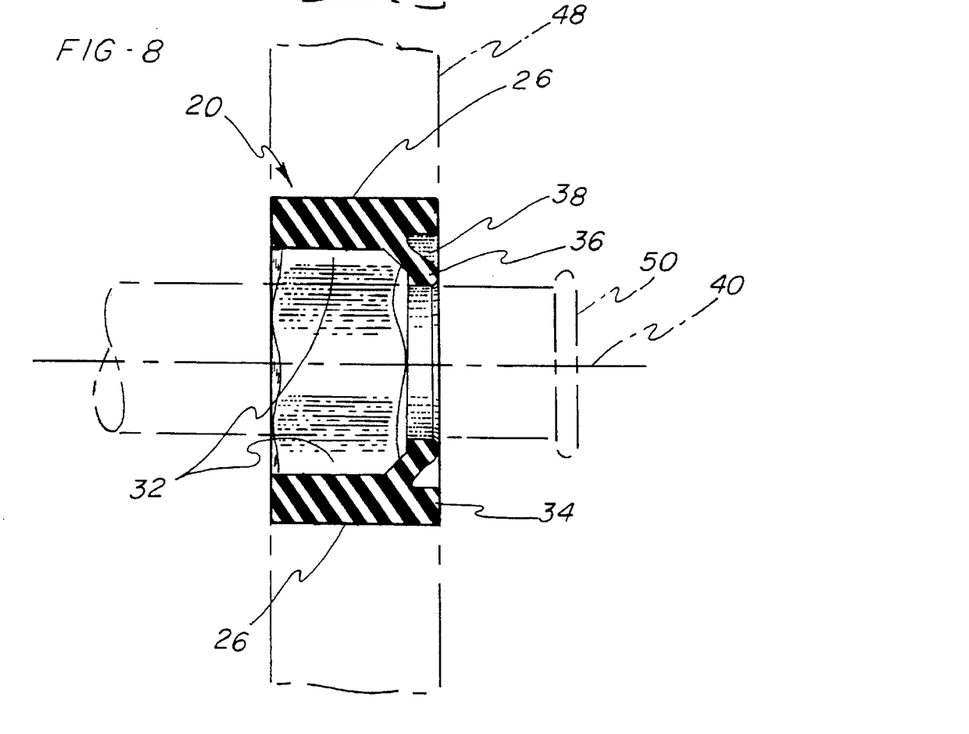

Referring to FIGS. 7 and 8, the damper seal 20 of the present invention is shown located in a housing 48 with the outer surface of the outer seal 34 slightly compressed radially inwardly to form a seal against the housing 48. A tube 50, or fuel nozzle, positioned in the damper seal 20 engages the inner seal 36 which is expanded slightly radially outwardly and forms a positive seal with the tube 50. It can be seen that the channel 38 allows the pressure in the housing 48 to force the outer seal 34 against the housing 48 and the inner seal 36 against the tube 50. Thus, as the pressure increases the sealing of both inner 36 and outer 34 seals will increase.

As best seen in FIG. 7, the inner scallops 30 engage the tube 50 for maintaining the tube 50 in coaxial relationship with the seal, and the outer channels 28 are shown located in spaced relation to the housing 48. Further, as best seen in FIG. 8, the outer scallops 26 are shown engaged with the housing 48 and the channels 32 are shown located in spaced relation to the tube 50. It should be evident from the above description that, as a result of the inner scallops and outer scallops being circumferentially offset relative to each other, swelling of the damper seal 20 of the present invention will not affect the sealing characteristics of the damper seal. Further, this offset provides the maximum dampening of vibrations to avoid noise being transmitted through the damper seal.

Figure 9:
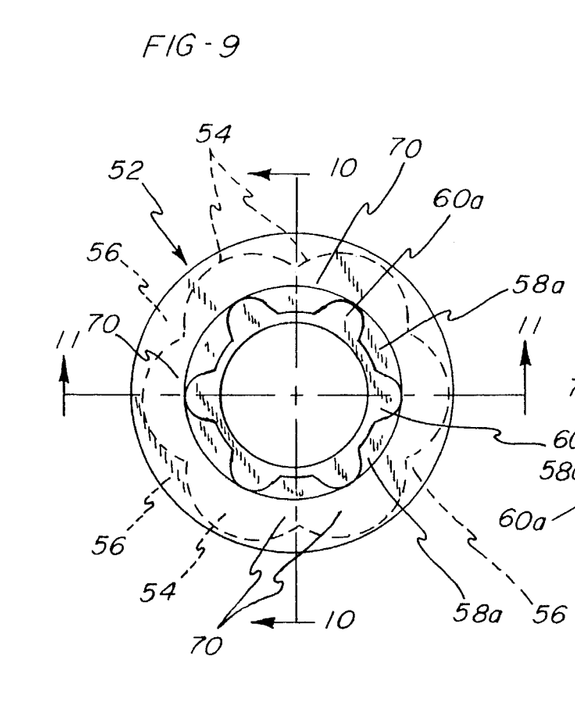
FIG. 9 is an end view of an additional embodiment of the present invention wherein the opposing end view is identical.
Figure 10:
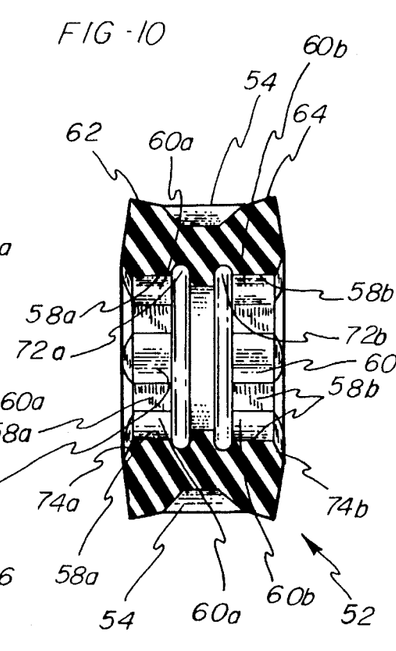
FIG. 10 is a cross-sectional view taken along line 10—10 in FIG. 9.
Figure 11:
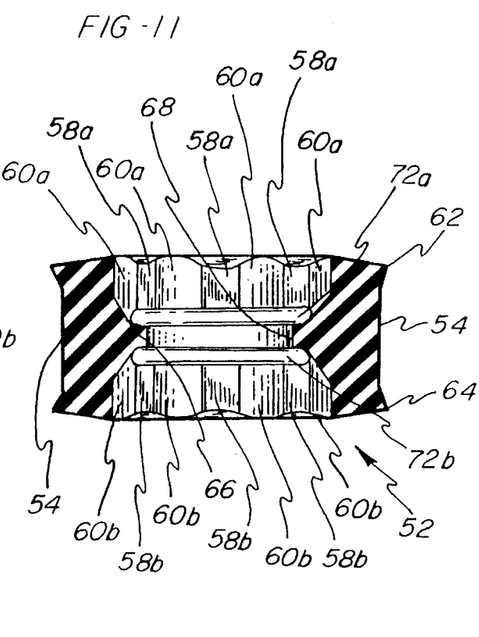
FIG. 11 is a cross-sectional view taken along line 11—11 in FIG. 9.

Referring to FIGS. 9–11, an alternative embodiment of the present invention is illustrated. In this embodiment, a damper seal 52 is provided including a plurality of outer ribs or scallops 54 which define longitudinally extending channels 56 located between adjacent scallops 54. In addition, inner ribs or scallops 58a, 58b are located on an inner portion of the damper seal 52 and define longitudinally extending inner channels 60a, 60b.

The damper seal 52 is further provided with sealing edges 62 and 64 which are located radially outwardly from the outer edges of the outer scallops 54 at opposing ends of the damper seal 52. In addition, a centrally located inner seal 66 is located between the inner scallops 58a and 58b and defines an inner sealing surface 68 for engaging a fuel nozzle in sealing engagement as in the previous embodiment. The outer sealing edges 62, 64 are similarly adapted to engage an inside diameter of a housing to thereby provide a sealing interface between the housing and fuel nozzle.

Further, it should be noted that the outer sealing edges 62, 64 and inner seal 66 are adapted to compress when engaged with an inside diameter of a housing and a fuel nozzle, respectively. Thus, the outer scallops 54 and inner scallops 58a, 58b will be positioned in engagement with the respective surfaces on the housing and the fuel nozzle.

As in the previous embodiment, the outer scallops 54 are offset from the inner scallops 58a, 58b such that vibrations will not be transmitted directly through the damper seal 52, but will have to pass through a bridge of material 70. Further, inner channels 72a and 72b are defined between the inner scallops 58a, 58b and the inner seal 66 such that a flexible area is provided between the seal 66 and the inner scallops 58a, 58b.

It should also be noted that inner edges 74a, 74b located at the ends of the damper seal 52 define tapered surfaces on the inner scallops 58a, 58b to facilitate insertion of a fuel nozzle through either end of the damper seal 52. Thus, it should be apparent that the particular orientation of the present damper seal 52 on the fuel nozzle is not critical such that the present damper seal design avoids assembly mistakes which could occur if the damper seal 52 were adapted to be inserted onto the fuel nozzle in only a single direction. In addition, by locating the inner seal 66 at an intermediate position between the inner scallops 58a, 58b, the damper seal 52 is formed as a symmetrical member such that the orientation of the damper seal in its intended use will not affect its sealing or dampening characteristics.

The above-described damper seal provides a seal for use in various applications which can be used in conditions where temperature variations, such as from −40° C. to +140° C., may occur without affecting the sealing and dampening capabilities of the seal. The present seal may also be made out of a less expensive material as compared to past seals in order to accomplish the required sealing and dampening functions. For example, the materials to be used for the present invention could be a fluorosilicone or alternatively NBR. Also, the provision of the channels 28, 32 results in less material being required for the present damper seal than for prior dampers.

Furthermore, the offsetting of the scallops allows a flanged fuel spout or tube to be easily inserted into the seal as compared to the solid seal construction of the prior art construction wherein no channels were provided.

Figure 12:
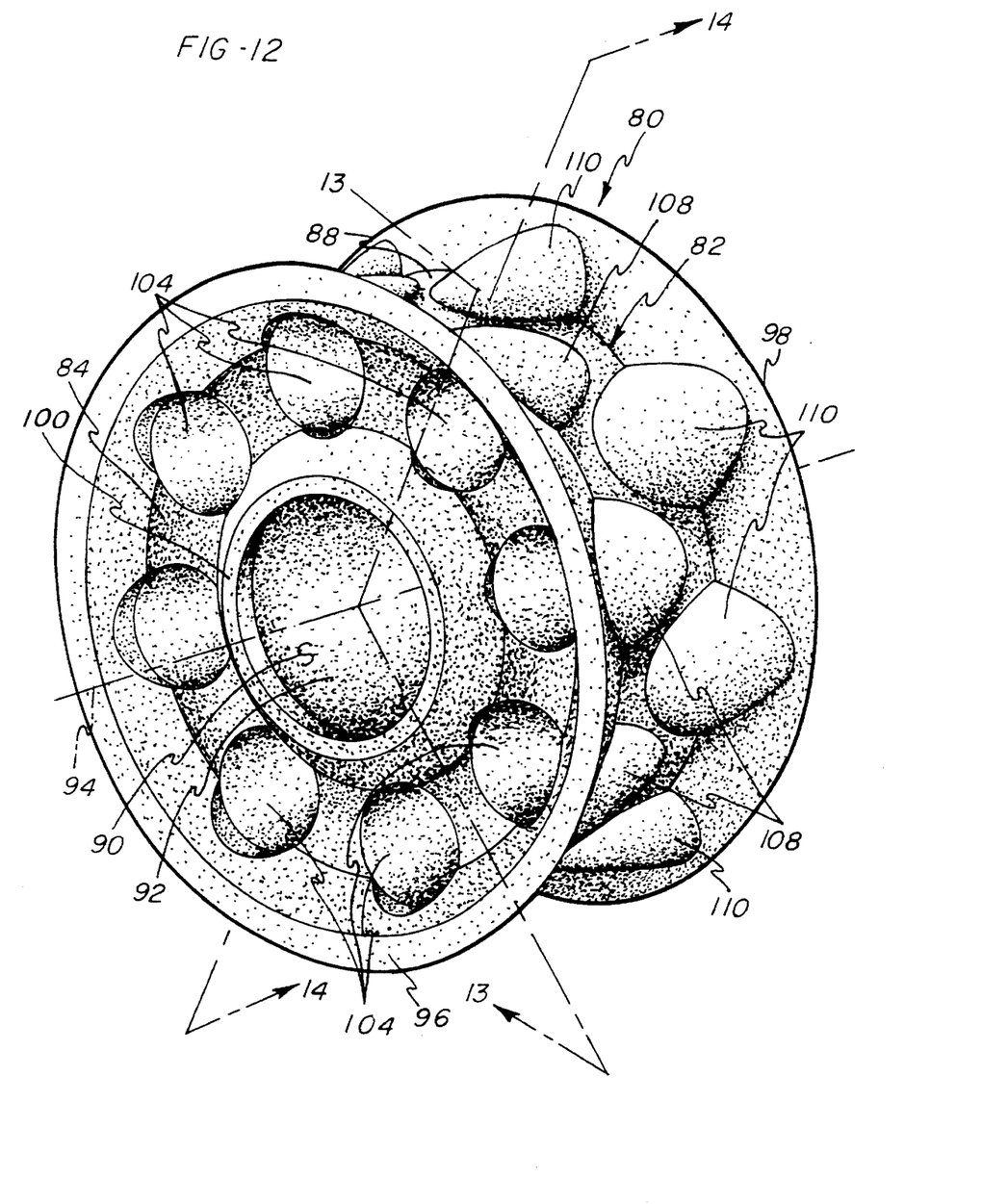
FIG. 12 is a perspective end view of a further embodiment of the present invention wherein the opposing end view is identical.
Figure 13:
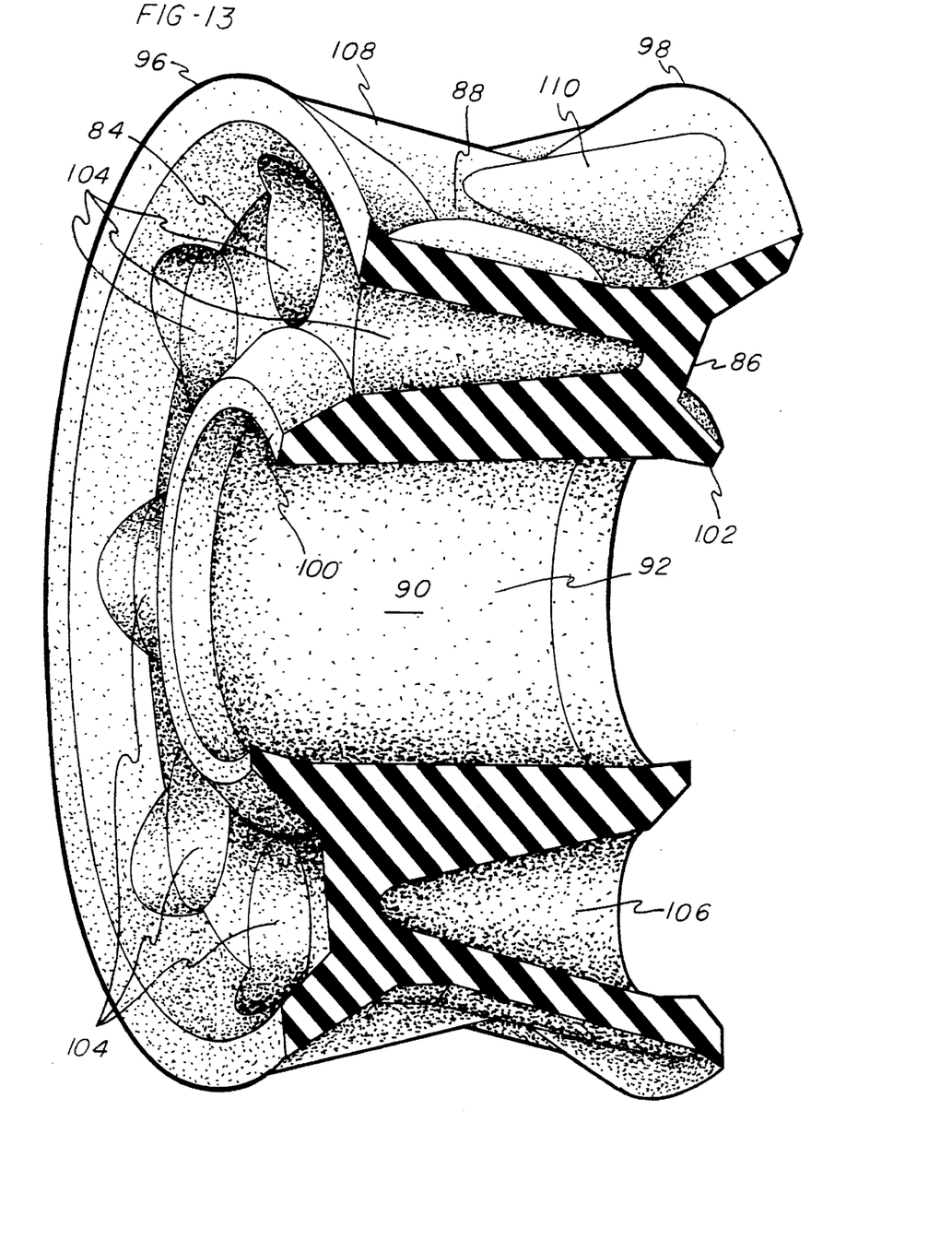
FIG. 13 is a perspective cross-sectional view taken along line 13—13 in FIG. 12.
Figure 14:
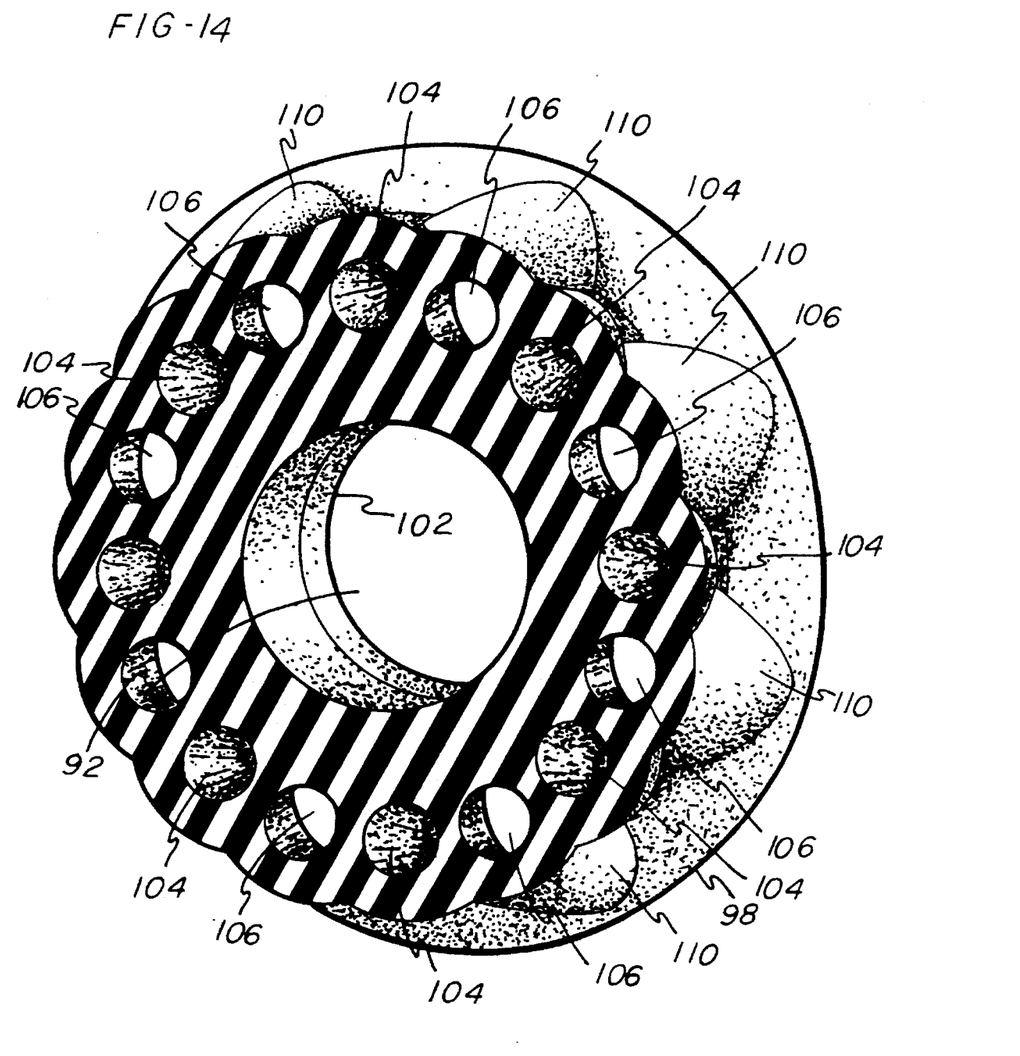
FIG. 14 is a perspective cross-sectional view taken along line 14—14 in FIG. 12.

Referring to FIGS. 12–14, an alternative embodiment of the damper seal is illustrated. The damper seal 80 of the present embodiment includes a body portion 82 formed of an elastomeric material and having opposing first and second ends 84, 86. The body portion 82 further includes a substantially cylindrical exterior surface 88 and substantially cylindrical interior surface 90, and the interior surface 90 defines an opening 92 extending through the body portion 82 along a longitudinal axis 94.

An exterior annular seal 96, 98 extends radially outwardly from each of ends 84, 86 of the body portion 82. In addition, the exterior annular seals 96, 98 extend axially outwardly from the ends 84, 86 and are adapted to engage with a housing surrounding the damper seal 80 to form a seal between the damper seal 80 and the housing.

Interior annular seals 100, 102 extend radially inwardly and axially outwardly from the body portion ends 84, 86. The interior annular seals are adapted to engage a tube extending through the opening 92 of the damper seal 80 whereby a seal is formed between the damper seal 80 and the tube extending therethrough.

A plurality of conically shaped apertures 104, 106 extend axially into the body portion 82 from the respective ends 84, 86. The apertures 104 terminate adjacent to and axially inwardly from the end 86, and the apertures 106 terminate adjacent to and axially inwardly from the end 84. The circumferential location of the apertures 104 alternates with the circumferential location of the apertures 106 around the body portion 82.

As seen in the cross-section of FIG. 14 taken through the axial center of the damper seal 80, the apertures 104, 106 have essentially the same diameter at the central portion of the damper element 80. In addition, it can be seen that a web-like structure is defined in the body portion 82 by the apertures 104, 106. This web-like structure permits expansion of the material forming the body portion 82. Thus, when the damper seal 80 is located within a housing, with a tube extending therethrough, the material between the exterior surface 88 and interior surface 90 is capable of expanding, such as in response to contact with fuel. Further, it should be noted that the exterior surface 88 is formed with outwardly curved portions 108, 110. The outwardly curved portions 108, 110 are contoured around the conically shaped apertures 104, 106, respectively.

It should be noted that the damper seal 80 of the present embodiment provides vibration dampening between the interior annular seals 100, 102 and the exterior annular seals 96, 98 in a manner similar to the previous embodiments. In addition, the damper seal 80 ensures that fluid flow past the damper seal 80 is effectively prevented. A further attribute of the present embodiment is that the provision of apertures 104, 106, as well as the contoured exterior surface 88 permits the present damper seal 80 to be produced using as much as 25% less material than the previous embodiments.

It should also be noted that the outwardly curved portions 108, 110 further provide contact points for engaging a housing with the space between the outwardly curved portions 108, 110 accommodating flexing and expansion of the body portion 82. Thus, the damper seal 80 of the present embodiment provides advantages similar to those associated with the previous embodiments.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A damper seal comprising:
   a body portion having an exterior surface and opposing ends, said body portion defining a longitudinal axis;
   an interior surface defining an opening extending through said body portion;
   means defining a plurality of apertures extending axially into said body portion from at least one of said ends; and
   wherein said exterior surface includes outwardly curved portions contoured around each of said apertures.

2. The damper seal as recited in claim 1 wherein said apertures extend to a location adjacent to and inwardly from the other of said ends.

3. The damper seal as recited in claim 1 wherein said apertures are located radially between said exterior surface and said interior surface.

4. The damper seal as recited in claim 1 wherein a web-like structure is defined in said body portion by said apertures for permitting expansion of material forming said body portion between said exterior and interior surfaces.

5. The damper seal as recited in claim 1 including an exterior annular seal extending radially outwardly from said exterior surface for engaging with a housing surrounding said damper seal.

6. The damper seal as recited in claim 1 including an interior annular seal extending radially inwardly from said interior surface for engaging with a tube extending through said damper seal.

7. The damper seal as recited in claim 1 wherein said plurality of apertures each define a substantially conical shape within said body portion.

8. A damper seal comprising:
   a body portion having an exterior surface and opposing first and second ends, said body portion defining a longitudinal axis;
   an interior surface defining an opening extending through said body portion along said longitudinal axis;
   a plurality of apertures extending axially into said body portion from each of said ends toward an opposing end; and
   each said aperture including an interior terminal end wherein said terminal ends of said apertures extending into said body portion from said first end are located adjacent to said second end, and said terminal ends of said apertures extending into said body portion from said second end are located adjacent to said first end, such that said apertures extending from said first end are in side-by-side relationship to said apertures extending from said second end.

9. The damper seal as recited in claim 8 including exterior annular seals extending radially outwardly from said exterior surface at each of said ends for engaging with a housing surrounding said damper seal.

10. The damper seal as recited in claim 8 including interior annular seals extending radially inwardly from said interior surface at each of said ends for engaging with a tube extending through said damper seal.

11. The damper seal as recited in claim 8 wherein each of said apertures define a substantially conical shape within said body portion.

12. The damper seal as recited in claim 11 wherein said exterior surface includes outwardly curved portions contoured around the substantially conical shape of said apertures.

13. The damper seal as recited in claim 8 wherein a web-like structure is defined in said body portion by said apertures for permitting expansion of material forming said body portion between said exterior and interior surfaces.

14. The damper seal as recited in claim 13 wherein said damper seal is formed of an elastomeric material.

15. A damper seal comprising:
   a body portion formed of an elastomeric material and having opposing first and second ends, said body portion defining a longitudinal axis;
   a plurality of substantially conically-shaped apertures extending axially into said body portion from each of said ends toward an opposing end;
   an interior surface defining an opening extending through said body portion along said longitudinal axis; and
   wherein a web-like structure is defined in said body portion by said apertures for permitting expansion of said material forming said body portion when said body portion is located in engagement within a housing with a tube extending therethrough;
   an exterior surface including outwardly curved portions contoured around the substantially conically shaped apertures;
   exterior annular seals extending radially outwardly from said exterior surface at each of said ends for engaging with a housing surrounding said damper seal; and
   interior annular seals extending radially inwardly from said interior surface at each of said ends for engaging with a tube extending through said damper seal.

* * * * *